(12) United States Patent
Wiseman et al.

(10) Patent No.: US 8,185,101 B1
(45) Date of Patent: May 22, 2012

(54) HANDHELD PORTABLE REAL-TIME TRACKING AND COMMUNICATIONS DEVICE

(75) Inventors: James M. Wiseman, Albuquerque, NM (US); Loren E. Riblett, Jr., Edgewood, NM (US); Karl L. Green, Albuquerque, NM (US); John A. Hunter, Albuquerque, NM (US); Robert N. Cook, III, Rio Rancho, NM (US); James R. Stevens, Arlington, VA (US)

(73) Assignee: Sandia Corporation, Albuquerque, NM (US)

(*) Notice: Subject to any disclaimer, the term of this patent is extended or adjusted under 35 U.S.C. 154(b) by 629 days.

(21) Appl. No.: 12/388,592

(22) Filed: Feb. 19, 2009

Related U.S. Application Data

(60) Provisional application No. 61/043,753, filed on Apr. 10, 2008.

(51) Int. Cl.
*H04M 1/00* (2006.01)

(52) U.S. Cl. .................. 455/422.1; 455/426.1; 455/466; 340/539.13; 340/539.2

(58) Field of Classification Search ............ 370/395.42, 370/333, 395.2; 455/517, 512, 513, 435.3, 455/435.2, 11.1, 9, 67.11, 67.13, 133, 134, 455/135, 166.2, 552.1, 550.1, 226.1, 226.2, 455/41.1, 41.2, 418, 452.1, 452.2
See application file for complete search history.

(56) References Cited

U.S. PATENT DOCUMENTS

| | | | |
|---|---|---|---|
| 5,517,199 A * | 5/1996 | DiMattei | 342/357.31 |
| 7,034,678 B2 | 4/2006 | Burkley et al. | |
| 7,091,852 B2 | 8/2006 | Mason et al. | |
| 7,245,216 B2 | 7/2007 | Burkley et al. | |
| 7,817,986 B2 * | 10/2010 | Bonta et al. | 455/411 |
| 2005/0001720 A1 * | 1/2005 | Mason et al. | 340/539.13 |
| 2005/0171692 A1 * | 8/2005 | Hamblen et al. | 701/209 |
| 2005/0221813 A1 * | 10/2005 | Rajahalme et al. | 455/422.1 |
| 2007/0297876 A1 | 12/2007 | Meyers et al. | |
| 2008/0018458 A1 * | 1/2008 | Derrick et al. | 340/539.13 |
| 2008/0077320 A1 | 3/2008 | Loftus et al. | |
| 2008/0077326 A1 | 3/2008 | Funk et al. | |
| 2008/0218331 A1 | 9/2008 | Baillot | |
| 2008/0221793 A1 | 9/2008 | Fisher et al. | |
| 2008/0224854 A1 | 9/2008 | Furey et al. | |

OTHER PUBLICATIONS

Riblett, L.E. et al., "TacNet: Mobile Ad Hoc Secure Communications Network", Proceedings of the 41rst International Carnahan Conference of Security Technology, IEEE, Oct. 2007, Ottawa, Canada.
Riblett, L.E. et al., "TacNet Tracker: Built-in Capabilities for Situational Awareness", Proceedings of the 2008 IEEE International Carnahan Conference of Security Technology, Prague, Czech Republic, Oct. 2008.

* cited by examiner

*Primary Examiner* — Shawki S Ismail
*Assistant Examiner* — Christopher Lo
(74) *Attorney, Agent, or Firm* — Olivia J. Tsai

(57) ABSTRACT

Portable handheld real-time tracking and communications devices include; a controller module, communications module including global positioning and mesh network radio module, data transfer and storage module, and a user interface module enclosed in a water-resistant enclosure. Real-time tracking and communications devices can be used by protective force, security and first responder personnel to provide situational awareness allowing for enhance coordination and effectiveness in rapid response situations. Such devices communicate to other authorized devices via mobile ad-hoc wireless networks, and do not require fixed infrastructure for their operation.

15 Claims, 4 Drawing Sheets

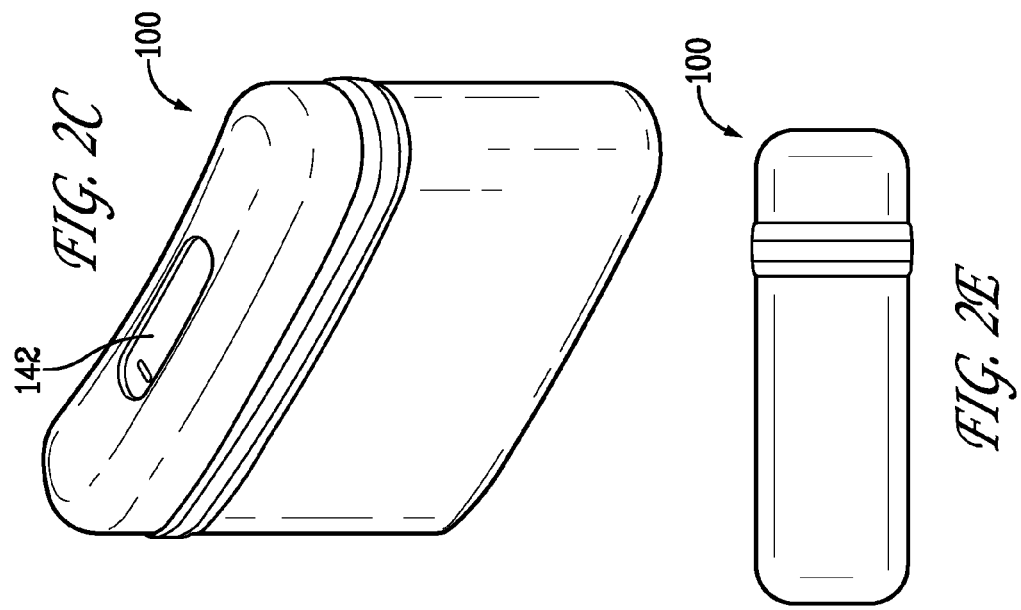
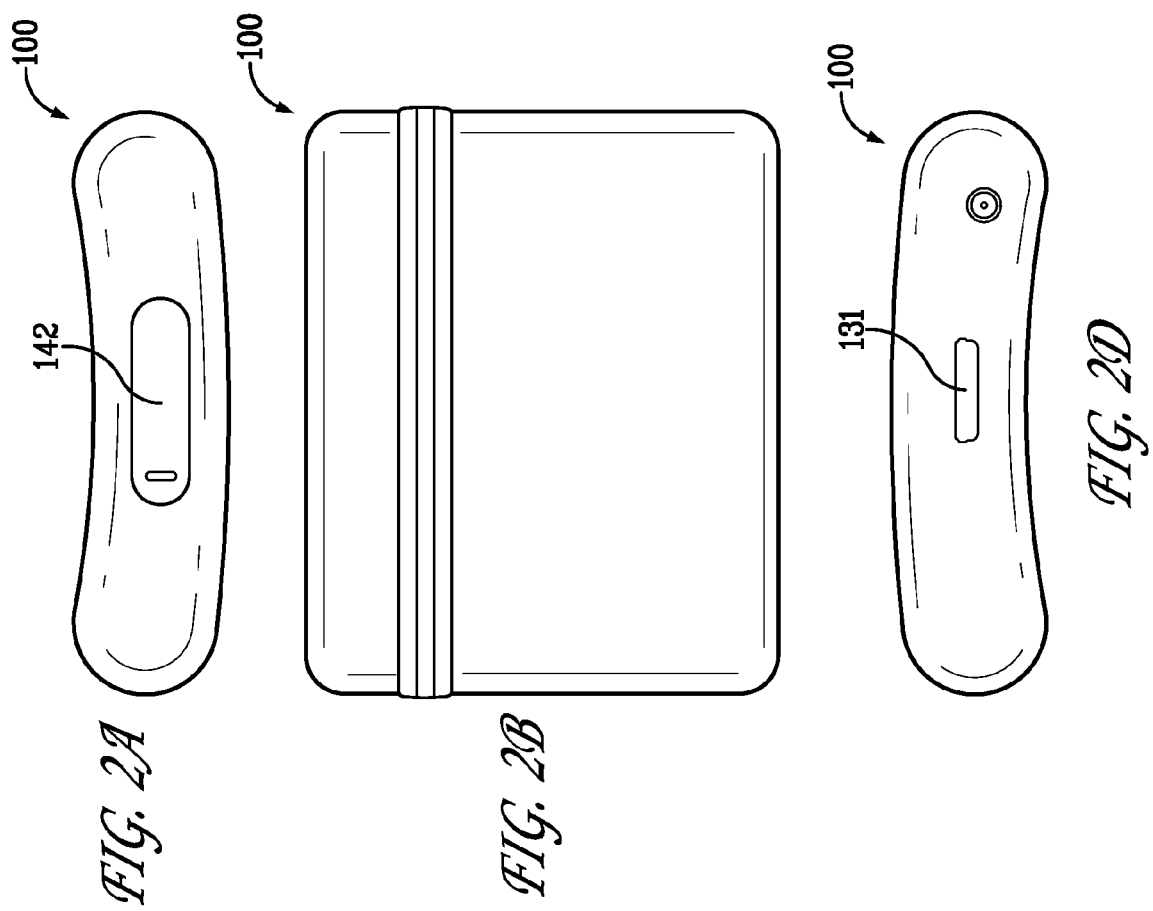

HANDHELD PORTABLE REAL-TIME TRACKING AND COMMUNICATIONS DEVICE

RELATED APPLICATIONS

This application claims the benefit of U.S. Provisional Application No. 61/043,753 filed on Apr. 10, 2008, the entirety of which is herein incorporated by reference.

STATEMENT REGARDING FEDERALLY SPONSORED RESEARCH OR DEVELOPMENT

The United States Government has certain rights in this invention pursuant to Department of Energy Contract No. DE-AC04-94AL85000 with Sandia Corporation.

FIELD OF THE INVENTION

The invention generally relates to communication systems and devices that provide situational awareness and real-time tracking of physical assets over mobile ad hoc networks, which do not require fixed infrastructure. The present invention further relates to hand held portable wireless devices that provide real-time tracking and communication for personnel such as first responders and security forces.

BACKGROUND OF THE INVENTION

Leaders of teams such as first responders (e.g. police, firemen, emergency crews, Blue Forces, security personnel etc.) to a critical circumstance (e.g. accident, fire, natural disaster, security breach etc.) must maintain situational awareness to effectively react, coordinate, and respond to circumstances that can often become hazardous. Effective communications and positional information of assets including personnel are critical to decision makers in coordinating such activities. After evaluations conducted by the inventors demonstrated the suitability of a mesh networking communication system, an in-vehicle network was developed and deployed that not only operates without fixed infrastructure (such as towers, spoke-and-hub relays etc.) but one that also incorporates security features. Extensive testing indicated that the ad hoc network worked well and could be scaled up, secured and operated at highway speeds. The latter characteristic is particularly useful for applications which depend upon mobile communications without fixed infrastructure.

The Tactical Network or TacNet mobile ad hoc communications network was therefore developed to operate in a mobile environment without fixed infrastructure, provide connectivity to a fixed network, when desired and provide Blue Force personnel with secure access to critical data, such as real-time maps of resource (e.g. personnel) positions. See for example: Riblett, L. E., et al., "TACNET: MOBILE AD HOC SECURE COMMUNICATIONS NETWORK", proceedings of the 41rst International Carnahan Conference of Security Technology, IEEE, October 2007, Ottawa, Canada, referred to hereinafter as Riblett (1), the entirety of which is incorporated herein by reference. The development of TacNet addresses a variety of issues including mobile communications without fixed infrastructure and inclusion of security features, such as access control lists and encrypted communications. TacNet employs a line-of-sight mesh radio network, which is self-forming, self-healing and multi-hopping.

Success with the in-vehicle system led to the development of a portable unit, the "TacNet Tracker™" that could operate away from a vehicle, and be carried by personnel in the field. It was found that modification of personal digital assistants or similar available devices was not practical as they presented substantial difficulty in integrating a custom application into often proprietary operating systems, cost was prohibitive and viable lifetimes beyond five years was a concern. See for example: Riblett et al., "TACNET TRACKER: BUILT-IN CAPABILITIES FOR SITUATIONAL AWARENESS", presented at the 2008 IEEE International Carnahan Conference on Security Technology, Prague, Czech Republic, October 2008, referred to hereinafter as Riblett (2), the entirety of which is incorporated herein by reference.

Embodiments of the present invention include portable wireless computers that provide secure real-time tracking and self-forming connectivity through the integration of uniquely packaged components and customized software. Tracking devices according to the present invention are wearable (e.g. handheld) low-cost devices that can accommodate a variety of network options, such as mesh radio network or 802.11 wireless. When operated with a mesh network—a mobile ad hoc network that accommodates for example, data speeds up to 6 Mbyte per second—tracking devices according to the present invention can provide situational awareness of individuals in the field securely and without the need for fixed infrastructure. These tracking devices let authorized individuals share and display the global positioning system (GPS) locations of all authorized devices (e.g. according to an access control list). Both the In-Vehicle and TacNet Tracker™ systems can be applied in combination or separately to a variety of purposes, including real-time training analysis, targeting capability and friend or foe identification. The TacNet Tracker™ is hereinafter referred to as the "tracker" a "tracking device" or simply as a "device".

An application incorporating trackers according to the present invention can include two systems: (1) an In-Vehicle system, a workstation including a graphical user interface and (2) a Dismounted Solution, hand held portable real-time tracking and communication device(s) also know as the TacNet Tracker™.

Unlike the extensive add-ons required for laptop computers or personal digital assistants (PDAs) to provide a secure tracking capability, trackers according to the present invention integrate the required functionality in a small, hand-held, low-cost device. Tracking devices according to the present invention further include the following advantages over the art: Unique combination of low-power computing technology with substantial memory footprint and real-time operating system; Multiple communication options such as Bluetooth, Ethernet connections, universal serial bus (USB) and Joint Test Action Group (JTAG, IEEE 1149.1 interface); Capability for voice-over internet (VOIP) protocol.

BRIEF DESCRIPTION OF THE DRAWINGS

The accompanying drawings, which are incorporated in and form part of the specification, illustrate several embodiments of the present invention and, together with the description, serve to explain the principles of the invention. The drawings provided herein are not drawn to scale.

FIG. 2 includes front, back and side views of an embodiment of a tracking device according to the present invention.

DETAILED DESCRIPTION OF THE INVENTION

Figure 1:
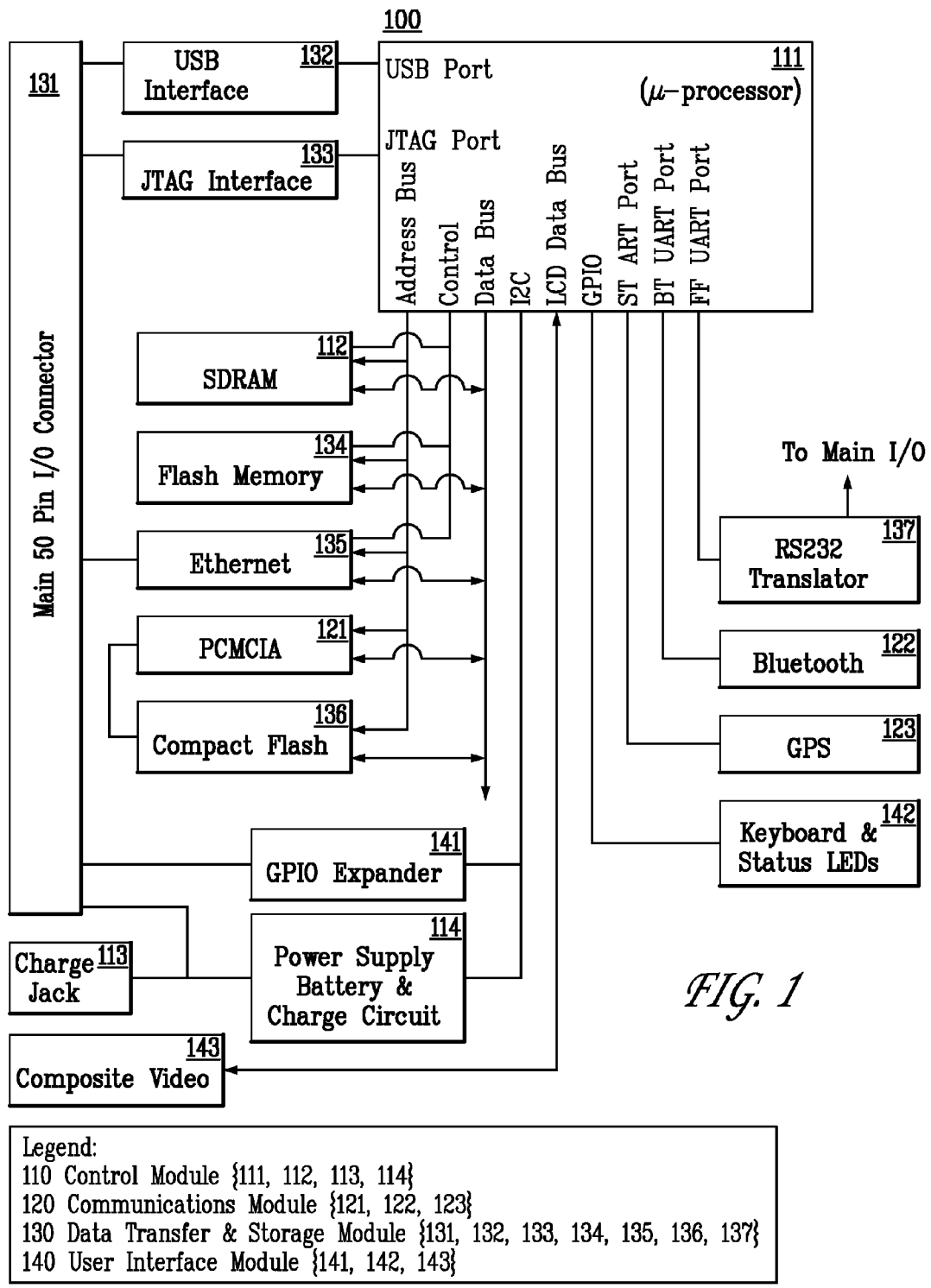
FIG. 1 is a schematic block diagram of an exemplary embodiment of a tracking device according to the present invention.

Embodiments of tracking devices according to the present invention were developed to operate within a primary application as a mesh node. The application tracks the GPS locations of all authorized devices so that their positions can be displayed on an in-vehicle workstation(s) as well as a centralized command center. The application is one feature that separates the present invention from other personal tracking devices (PTDs) as most; require fixed infrastructure and, do not offer a GPS engine. Although devices according to the present invention enable individuals to communicate securely via portable handheld units over mesh radio network or 801.22 wireless, the development of the devices focused on mesh network communication devices. An advantage in the use of a mesh network—referred to as ad hoc because the network dynamically forms based on nodes available—is the ability to communicate securely without fixed infrastructure. If a device becomes separated (e.g. line-of-sight is lost) the remaining components "self-heal" the network by forming another path to networked nodes. Although a limitation of the mesh radio network is line-of-sight, its ability to dynamically self-heal allows it to overcome most line-of-sight constraints.

In a mesh network, link quality is a combination of three variables: the radio frequency (RF) signal strength, the bit error rate and, the RF noise level. When a transmission encounters a node that has sufficient link quality, the node relays the transmission thus expanding the ad hoc network. In an exemplary embodiment, the user datagram protocol (UDP) data unicast transmission protocol was chosen for the wireless network rather than transmission control protocol (TCP). UDP unicasting is a connectionless protocol that runs on internet protocol (IP) networks primarily to broadcast messages; it does not break communications of have error responses or fault recovery. UDP unicasting simply transmits the message on a virtual port, which is used for port forwarding.

Where secure communications are desired, there must also be assurance that only authorized recipients will receive the transmissions. As described in Riblett (1) this assurance is achieved by using a developed transmit list (i.e. access list). Each device has a uniquely defined list of IP addresses that determines the devices to which it can transmit (i.e. intercommunicate). The tracking device creates the transmit list by; forming a neighbor list, i.e. any other mesh device in the area, comparing the neighbor list to a master transmit list which is a list of all authorized hardware units in the network and, creating a temporary transmit list, consisting of neighbor units that are also on the master transmit list. Additionally, the tracking device incorporates an encryption scheme such as Advanced Encryption Standard (AES) to provide additional assurance that all messages can be read only by authorized units.

The following description of an exemplary embodiment of a tracking device, groups the various elements comprising the embodiment into modules by functionality for convenience only. The various elements could be distributed differently among the modules presented, without impacting the practice of the invention. For example, through the use of various hard-wired (e.g. custom logic devices) and programmable devices (e.g. programmable logic devices), the functions of tracking devices according to the present invention can partitioned between modules in a variety of configurations, without impacting the practice of the invention.

FIG. 1 is a schematic block diagram of an exemplary non-limiting embodiment of a tracking device 100 according to the present invention. Tracking device 100 comprises a controller module 110 that serves to provide overall operational control of the various modules and components that comprise the tracking device 100. Controller module 110 can include a low power micro-processor 111 suitable for portable electronic equipment, such as the PXA270 XScale® processor, commercially available from Intel Corporation, Santa Clara, Calif., USA. Controller module 110 can include memory 112 for storage of applications (i.e. instructions) for the operation of the tracker 100. In the exemplary embodiment, the memory 112 can be 64 Mbyte of synchronous dynamic random access memory (SDRAM). This amount of SDRAM has been found to be adequate in field trials of tracking devices to date, although provisions for expanding this memory have been provided for, as described below. An encryption module (not shown) can be incorporated into the controller module 110 or as a standalone module. The encryption module can encrypt transmissions from the device by a variety of standards (such as AES) to assure secure communications with other authorized devices. An access control module (not shown) for maintaining a listing of devices authorized for communication with the tracker 100 can as well be implemented in the control module, or as a standalone module. The access control module provides an additional level of assurance that only authorized devices receive communications from the tracking device 100. For convenience, a power supply 114 including a battery (e.g. lithium-ion battery), a battery charging circuit and charging jack can be included in the controller module 110, for example, mounted on a printed wiring board supporting the micro-processor 111, to provide power for the components comprising the tracking device 100.

Communications module 120 can include a personal computer memory card international association (PCMCIA) socket for accommodating a mesh network communication device 121 to allow the tracker to communicate with other authorized devices within a mesh network. In the present exemplary embodiment, a WMC6300 wireless modem card, commercially available from Motorola INC, Schaumburg, Ill., USA, was used. Communications module 120 can as well include a Bluetooth wireless protocol communications module 122 to provide connections up to abut a 20 m range. When combined with a Bluetooth earpiece and voice over internet (VOIP) application, users can communicate by voice via the tracking device. Numerous other Bluetooth capable devices may also be connected to the tracker, such as laptop computers or external GPS receivers. The communications module additionally comprises a GPS module 123 for obtaining precise positioning information of the tracker, for eventual communication to authorized devices. The GPS module can comprise a commercially available device, for example, the Lea-4A module available from u-blox AG, Thalwil, Switzerland. Antennas for the GPS module 123 and wireless communications module 121 can be incorporated within the housing of the tracker, or can as well be connected to external antennas if for example, it were desired to operate the tracker within a vehicle or as a "communications box".

The data transfer and storage (DTS) module 130 can include flash memory 134 for storage of applications and key configuration files (e.g. the transmit control list for authorized users) via Flash File system directories. A compact flash socket 136 can be included to allow large amounts of data storage on a memory card. An example of compact flash card use (e.g. as typically found in digital cameras) is storage of map display data. The DTS module additionally includes a main I/O connector, such as a 50 pin main I/O connector 131, which allows hardwire interconnection to external devices used primarily for set-up, programming and debugging of a tracker device. The 50 pin connector allows interconnection to external devices (e.g. computers) by use of an expansion board (not shown). The expansion board is not required for operation of the tracker but can be useful for tasks such as installing or debugging new software, battery charging and file transfer (e.g. with a USB thumb drive). In addition, the expansion board has the potential to serve as a bridge between a wireless network and a wired network, e.g. as part of an inexpensive, lightweight "communications box" to connect to existing networks. An ethernet port 135 can be included in the DTS module 130 which can be connected to wired networks, which has been found useful in debugging software. A USB Interface 132 can be included in the DTS module 130 for use with any USB device, e.g. a thumb drive. DTS module 130 can include an RS-232 and JTAG Interfaces (137, 133) as well. The RS-232 port for serial connections can be used as a system console to monitor and debug the operating system, or the port can be used to communicate with other serial devices as well. The JTAG port has been found to be useful for downloading operating system(s). Connection to the tracker by Ethernet, USB, RS-232 and/or JTAG Interfaces can be implemented through the expansion board (discussed above).

A user interface module 140 includes a membrane keypad module 142 with status indicating lights. In the exemplary embodiment of the tracker 100, the membrane keypad includes one button, one battery charge LED and three programmable LEDs. An example of a programmable LED would be a signal that informs a user about specific conditions, such as the end of an exercise. The user interface module 140 can include a general purpose I/O (GPIO) expander module 141 that in the exemplary embodiment can have eight bi-directional GPIO expanders, which provide digital I/O lines. The GPIO expander can be used for monitoring and control capabilities, e.g. turning off an indicator light or providing a "panic" button for a user. A composite video output 143 can be included in the DTS module and used to display video when the tracker is connected to a wired composite video standard display (not shown).

FIG. 2 includes views of the top, front, bottom, side and perspective views of an embodiment of a tracking device according to the present invention. In this exemplary embodiment of a tracking device 100, the modules and functionality of the tracker 100 are as described above (see FIG. 1) and can be accommodated in an enclosure of approximately 4.7"× 5.7"×1.5" overall dimensions, a size easily wearable or handheld by an operator in the field. In this configuration, the membrane keypad and status LEDs (142) are located in the "top" of the enclosure to be visible to the operator, and a 50 pin I/O connector (131) is located in the bottom surface of the enclosure.

Figure 3:
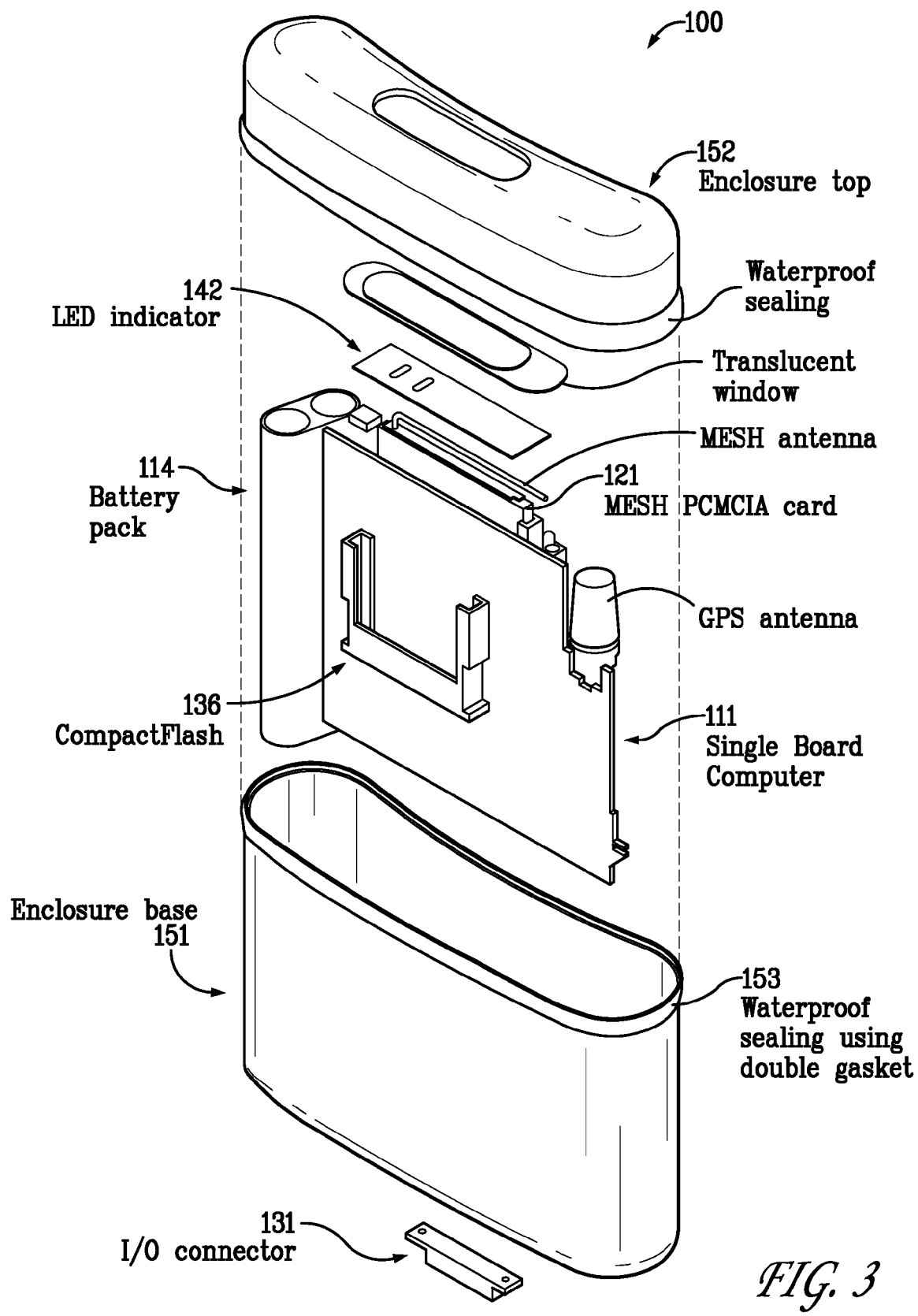
FIG. 3 is an exploded view of the embodiment of a tracking device shown in FIG. 2.

FIG. 3 is an exploded view of the embodiment of a tracking device shown in FIG. 2. The enclosure of the tracking device 100 can include a lower portion 151 and an upper portion 152, for example molded Acrylonitrile Butadiene Styrene (ABS) components, held together with tamper resistant fasteners (not shown), and sealed against the elements by means of a water resistant seal (e.g. gasket). The exploded view illustrates the location of modules and components within the enclosure of the exemplary embodiment of the device, including for example, antennas for the mesh 121 and GPS 123 communications modules.

Figure 4:
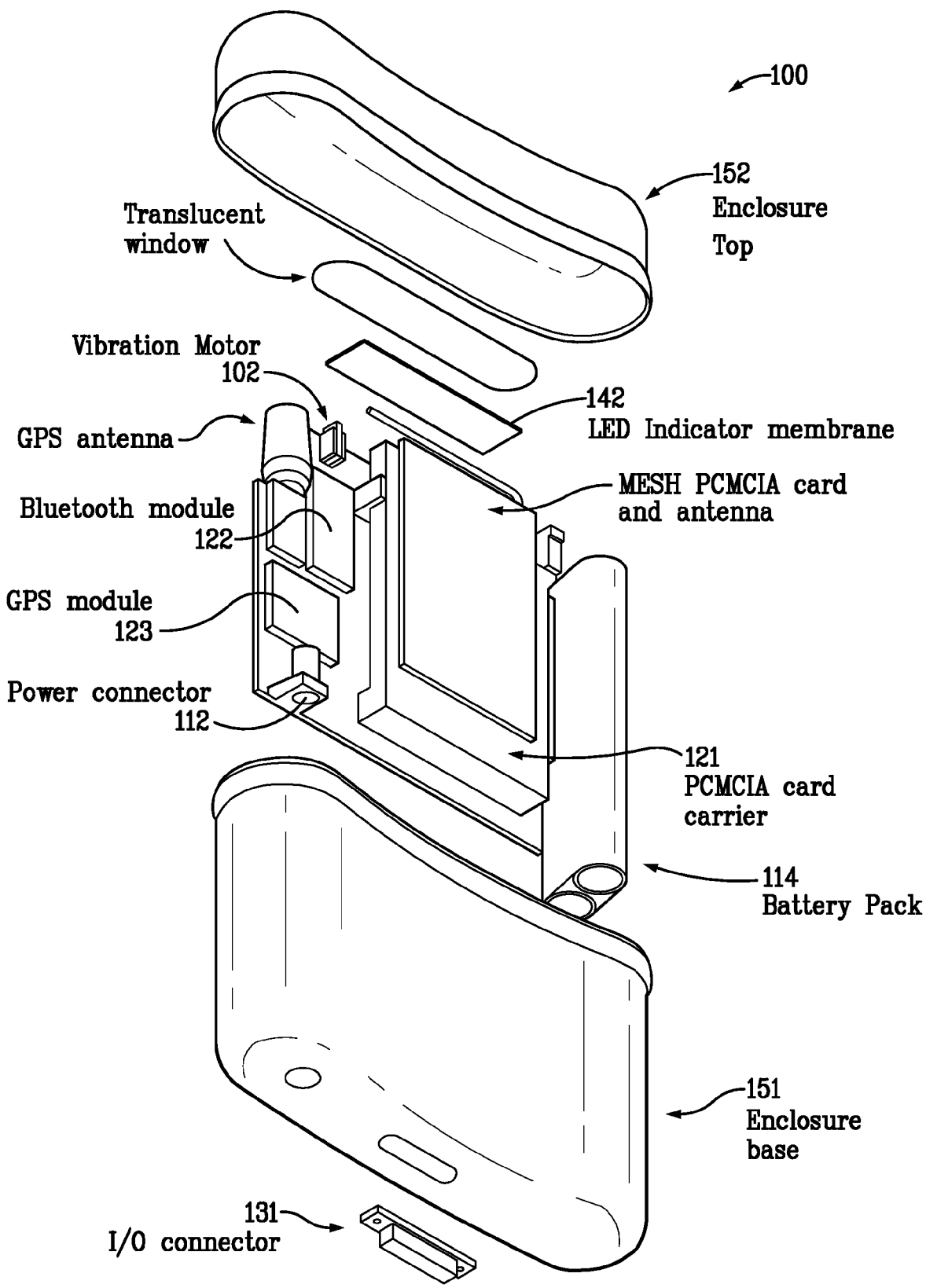
FIG. 4 is another exploded view of the embodiment of a tracking device shown in FIG. 2.

FIG. 4 is another exploded schematic view of the embodiment of a tracking device shown in FIG. 2. The exploded view illustrates the location of modules and components within the enclosure of the exemplary embodiment of the tracking device 100, including for example an optional vibration motor 102 that can be used to silently alert an operator to alarm conditions.

A system for communication and real-time tracking of assets can include a plurality of tracking devices according to the present invention, inter-communicating via a dynamically formed, ad hoc wireless mesh network. The mobile ad hoc network consists of nodes corresponding to each authorized device in the network (i.e. handheld tracker, in-vehicle tracker etc.). Networks thus formed are truly ad hoc, and can operate without fixed infrastructure. A system can additionally include multiple in-vehicle devices (e.g. mobile) that can comprise a workstation (e.g. laptop computer, personal computer etc.) including a graphical user interface (GUI) in communication with one or more hand-held tracking devices and optionally in communication with a fixed resource, such as a command center (e.g. immobile). In-vehicle devices such as those developed for TacNet (described above) provide for a communications network among authorized vehicles; suitable for use at highway speeds. In-vehicle systems can (via the GUI) display a map with icons representing the locations of other authorized vehicles in the network, in addition to the locations of authorized dismounted (e.g. hand-held) tracking devices in the field. The network is referred to as ad hoc because the network dynamically forms based on nodes available, i.e. when a transmitter discovers a node within a range, it forms a network with the node. If a unit becomes separated (e.g., line-of-sight is lost) the remaining components "self-heal" the network by forming an alternative communication path.

The above described exemplary embodiments present several variants of the invention but do not limit the scope of the invention. Those skilled in the art will appreciate that the present invention can be implemented in other equivalent ways. For example, the various modules and their functionality that make up the embodiments described above can be realized in many varied combinations of hardware and/or software. The actual scope of the invention is intended to be defined in the following claims.

What is claimed is:

1. A portable handheld real-time tracking and communications device comprising:
   a controller module including a micro-processor, the controller module operatively arranged to control and provide an interface between modules comprising the device, the controller module including,
   a power module operatively arranged to provide power to the modules comprising the device, the power module including a battery,
   a memory module operatively arranged to receive and store instructions for operating the modules comprising the device,
   an encryption module operatively arranged to encrypt information communicated from the device to a mobile ad hoc network,
   an access control module operatively arranged to create and maintain a listing of external devices authorized for communication with the device, the access control module comprises a master transmit list of devices authorized for communication with the device, a list of external devices within wireless range of the device, and a transmit list, the transmit list consisting of the union of the master transmit list and the list of external devices within wireless range of the device;
   a communications module operatively connected to the controller module, the communications module including, a global positioning system (GPS) module, the GPS module operatively arranged to provide global positioning information pertaining to the devices' position, a mesh network radio module, the mesh network radio module operatively arranged to communicate information between the device and the mobile ad-hoc network;

a data transfer and storage module operatively connected to the controller module, the data transfer and storage module including, an input-output connector operatively arranged to allow hard-wired communication with external hardware, a flash memory module, the flash memory module operatively arranged to store configuration files, a compact flash memory socket, the compact flash memory socket operatively arranged to accommodate a compact flash memory card, an external communication port;

a user interface module operatively connected to the controller module, the user interface module including, a keypad operatively arranged for operator input, a plurality of status indicating light emitting diodes (LEDs) the LEDs operatively arranged to indicate an operating status of one or more modules, a composite video output;

a water resistant enclosure operatively arranged to provide containment for the modules comprising the device, the enclosure comprising two or more portions, the two or more portions fastened together by tamper-resistant fasteners, the two or more portions incorporating a water resistant seal there between.

2. The device of claim 1 where the external communication port is one or more ports selected from the group consisting of an ethernet port, a universal serial bus (USB) port, an RS-232 port and a joint test action group (JTAG) port.

3. The device of claim 1 wherein the communications module further comprises a personal area communications (PAN) module, the PAN module configured for Bluetooth compatible communications between the device and external communication devices.

4. The device of claim 1 wherein the communications module further comprises a Personal Computer Memory Card International Association (PCMCIA) compatible socket, the socket configured to accept PCMCIA compatible devices thereby providing compatibility with a plurality of communication protocols.

5. The device of claim 1 further comprising a vibration motor operatively connected to the controller module, the vibration motor operatively arranged to provide physical notice of alarm conditions to an operator.

6. The device of claim 1 further comprising a GPS antenna operatively connected to the GPS module the GPS antenna contained within the enclosure.

7. The device of claim 1 further comprising a mesh radio communications antenna operatively connected to the communications module, the mesh radio communications antenna contained within the enclosure.

8. The device of claim 1 further comprising a graphics controller module operatively connected to the controller module, the graphics controller module operatively arranged to provide a composite video output to an external display device.

9. The device of claim 1 further comprising a battery charging module operatively connected to the power module and operatively arranged to charge the battery from an external power source.

10. The device of claim 1 wherein the user interface module further comprises a general purpose input-output (GPIO) expander, the GPIO expander comprising a plurality of bi-directional input-output lines, the plurality of bi-directional input-output lines operatively configured to provide digital input-output lines for interconnection to the external hardware.

11. A system for real-time tracking and communications comprising:

a plurality of portable handheld real-time tracking and communications devices, each of the plurality of devices comprising:

a controller module including a micro-processor, the controller module operatively arranged to control and provide an interface between modules comprising the device, the controller module including, a power module operatively arranged to provide power to the modules comprising the device, the power module including a battery, a memory module operatively arranged to receive and store instructions for operating the modules comprising the device, an encryption module operatively arranged to encrypt information communicated from the device to a mobile ad hoc network, an access control module operatively arranged to create and maintain a listing of external devices authorized for communication with the device, the access control module comprises a master transmit list of devices authorized for communication with the device, a list of external devices within wireless range of the device, and a transmit list, the transmit list consisting of the union of the master transmit list and the list of external devices within wireless range of the device;

a communications module operatively connected to the controller module, the communications module including, a global positioning system (GPS) module, the GPS module operatively arranged to provide global positioning information pertaining to the devices' position, a mesh network radio module, the mesh network radio module operatively arranged to communicate information between the device and the mobile ad-hoc network;

a data transfer and storage module operatively connected to the controller module, the data transfer and storage module including, an input-output connector operatively arranged to allow hard-wired communication with external hardware, a flash memory module, the flash memory module operatively arranged to store configuration files, a compact flash memory socket, the compact flash memory socket operatively arranged to accommodate a compact flash memory card, an external communication port;

a user interface module operatively connected to the controller module, the user interface module including, a keypad operatively arranged for operator input, a plurality of status indicating light emitting diodes (LEDs) the LEDs operatively arranged to indicate an operating status of one or more modules, a composite video output;

a water resistant enclosure operatively arranged to provide containment for the modules comprising the device, the enclosure comprising two or more portions, the two or more portions fastened together by tamper-resistant fasteners, the two or more portions incorporating a water resistant seal there between.

12. The system of claim 11 further comprising one or more in-vehicle tracking devices.

13. The system of claim 12 wherein the one or more in-vehicle tracking devices each incorporate a display and a graphical user interface (GUI).

14. The system of claim 13 wherein the one or more in-vehicle tracking devices are operationally configured to display the position of each device of the plurality of portable handheld real-time tracking and communications devices, on a map.

15. A portable handheld real-time tracking and communications device comprising:
   a controller module including a micro-processor, the controller module operatively arranged to control and provide an interface between modules comprising the device, the controller module including,
      a power module operatively arranged to provide power to the modules comprising the device, the power module including a battery,
      a memory module operatively arranged to receive and store instructions for operating the modules comprising the device,
      an encryption module operatively arranged to encrypt information communicated from the device to a mobile ad hoc network,
      an access control module operatively arranged to create and maintain a listing of external devices authorized for communication with the device;
   a communications module operatively connected to the controller module, the communications module including,
      a global positioning system (GPS) module, the GPS module operatively arranged to provide global positioning information pertaining to the devices' position,
      a mesh network radio module, the mesh network radio module operatively arranged to communicate information between the device and the mobile ad-hoc network;
   a data transfer and storage module operatively connected to the controller module, the data transfer and storage module including,
      an input-output connector operatively arranged to allow hard-wired communication with external hardware,
      a flash memory module, the flash memory module operatively arranged to store configuration files,
      a compact flash memory socket, the compact flash memory socket operatively arranged to accommodate a compact flash memory card,
      an external communication port;
   a user interface module operatively connected to the controller module, the user interface module including,
      a keypad operatively arranged for operator input,
      a plurality of status indicating light emitting diodes (LEDs) the LEDs operatively arranged to indicate an operating status of one or more modules,
      a composite video output, and
      a general purpose input-output (GPIO) expander, the GPIO expander comprising a plurality of bi-directional input-output lines, the plurality of bi-directional input-output lines operatively configured to provide digital input-output lines for interconnection to the external hardware; and
   a water resistant enclosure operatively arranged to provide containment for the modules comprising the device, the enclosure comprising two or more portions, the two or more portions fastened together by tamper-resistant fasteners, the two or more portions incorporating a water resistant seal there between.

* * * * *